(12) United States Patent
Chun et al.

(10) Patent No.: US 7,978,616 B2
(45) Date of Patent: Jul. 12, 2011

(54) METHOD FOR TRANSMITTING PDCP STATUS REPORT

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 12/405,677

(22) Filed: Mar. 17, 2009

(65) Prior Publication Data

US 2009/0238142 A1    Sep. 24, 2009

Related U.S. Application Data

(60) Provisional application No. 61/037,309, filed on Mar. 17, 2008, provisional application No. 61/038,470, filed on Mar. 21, 2008.

(30) Foreign Application Priority Data

Mar. 16, 2009    (KR) .......................... 10-2009-0022158

(51) Int. Cl.
    *H04L 1/00*    (2006.01)
(52) U.S. Cl. ........................................ 370/242; 370/310
(58) Field of Classification Search .................. 370/241, 370/241.1, 242, 252, 310, 328
    See application file for complete search history.

(56) References Cited

U.S. PATENT DOCUMENTS

| | | | |
|---|---|---|---|
| 6,594,240 B1 | 7/2003 | Chuah et al. | |
| 6,728,918 B1 | 4/2004 | Ikeda et al. | |
| 6,963,540 B2 | 11/2005 | Choi et al. | |
| 7,171,163 B2 | 1/2007 | Terry et al. | |
| 7,181,667 B2 | 2/2007 | Argyropoulos et al. | |
| 7,227,856 B2 | 6/2007 | Wu | |
| 7,227,857 B2 | 6/2007 | Kuo | |
| 7,227,868 B2 | 6/2007 | Inden | |
| 7,295,573 B2 | 11/2007 | Yi et al. | |
| 7,313,116 B2 | 12/2007 | Lee et al. | |
| 7,817,595 B2 | 10/2010 | Wu | |
| 2002/0001314 A1 | 1/2002 | Yi et al. | |
| 2002/0009999 A1 | 1/2002 | Lee et al. | |

(Continued)

FOREIGN PATENT DOCUMENTS

EP    1 343 267 A2    9/2003

(Continued)

OTHER PUBLICATIONS

Wang et al, U.S. Appl. No. 60/976,139.*

(Continued)

*Primary Examiner* — Ricky Ngo
*Assistant Examiner* — Wei-Po Kao
(74) *Attorney, Agent, or Firm* — Birch, Stewart, Kolasch & Birch, LLP

(57) ABSTRACT

A method of transmitting PDCP (Packet Data Convergence Protocol) status reports, is performed by a mobile terminal by receiving, from an upper layer, a request for PDCP (Packet Data Convergence Protocol) re-establishment; detecting whether there are any out-of-sequence PDCP SDUs (service data units) stored; and if there is at least one out-of-sequence PDCP SDU stored, allocating a bitmap field of length in bits equal to the number of PDCP SNs from and not including the first out-of-sequence PDCP SDU up to and including a last out-of-sequence PDCP SDU.

25 Claims, 9 Drawing Sheets

(a)

(b)

U.S. PATENT DOCUMENTS

| | | | |
|---|---|---|---|
| 2002/0122411 | A1 | 9/2002 | Zimmerman et al. |
| 2003/0007490 | A1 | 1/2003 | Yi et al. |
| 2003/0194992 | A1 | 10/2003 | Kim et al. |
| 2004/0146019 | A1 | 7/2004 | Kim et al. |
| 2004/0147236 | A1 | 7/2004 | Parkvall et al. |
| 2004/0153852 | A1* | 8/2004 | Wu .................................. 714/43 |
| 2004/0156330 | A1 | 8/2004 | Yi et al. |
| 2005/0020260 | A1 | 1/2005 | Jeong et al. |
| 2005/0047416 | A1 | 3/2005 | Heo et al. |
| 2005/0083943 | A1 | 4/2005 | Lee et al. |
| 2005/0096017 | A1 | 5/2005 | Kim |
| 2005/0118992 | A1 | 6/2005 | Jeong et al. |
| 2005/0254467 | A1 | 11/2005 | Li et al. |
| 2005/0259662 | A1 | 11/2005 | Kim et al. |
| 2005/0287957 | A1 | 12/2005 | Lee et al. |
| 2006/0067238 | A1* | 3/2006 | Olsson et al. ................. 370/242 |
| 2006/0067289 | A1 | 3/2006 | Lee et al. |
| 2006/0072503 | A1 | 4/2006 | Kim et al. |
| 2006/0084389 | A1 | 4/2006 | Beale et al. |
| 2006/0154680 | A1 | 7/2006 | Kroth et al. |
| 2006/0165045 | A1 | 7/2006 | Kim et al. |
| 2006/0203780 | A1 | 9/2006 | Terry |
| 2006/0233200 | A1 | 10/2006 | Fifield et al. |
| 2006/0251027 | A1 | 11/2006 | Chun et al. |
| 2006/0251105 | A1 | 11/2006 | Kim et al. |
| 2006/0268798 | A1 | 11/2006 | Kim et al. |
| 2006/0280145 | A1 | 12/2006 | Revel et al. |
| 2007/0053309 | A1 | 3/2007 | Poojary et al. |
| 2007/0060139 | A1 | 3/2007 | Kim et al. |
| 2007/0079207 | A1 | 4/2007 | Seidel et al. |
| 2007/0081513 | A1 | 4/2007 | Torsner |
| 2007/0091810 | A1 | 4/2007 | Kim et al. |
| 2007/0201397 | A1 | 8/2007 | Zhang |
| 2007/0268861 | A1 | 11/2007 | Diachina et al. |
| 2007/0274278 | A1 | 11/2007 | Choi et al. |
| 2008/0051098 | A1 | 2/2008 | Rao |
| 2008/0084851 | A1 | 4/2008 | Kim et al. |
| 2008/0146242 | A1 | 6/2008 | Alanara et al. |
| 2008/0182609 | A1 | 7/2008 | Somasundaram et al. |
| 2008/0186936 | A1 | 8/2008 | Chun et al. |
| 2008/0186944 | A1 | 8/2008 | Suzuki et al. |
| 2008/0305819 | A1 | 12/2008 | Chun et al. |
| 2009/0104890 | A1* | 4/2009 | Wang et al. .................... 455/410 |
| 2009/0175163 | A1* | 7/2009 | Sammour et al. ............. 370/216 |
| 2010/0142457 | A1 | 6/2010 | Chun et al. |

FOREIGN PATENT DOCUMENTS

| | | |
|---|---|---|
| EP | 1508992 A2 | 2/2005 |
| EP | 1689130 A1 | 8/2006 |
| EP | 1768297 A2 | 3/2007 |
| EP | 1796405 A1 | 6/2007 |
| JP | 2003-516021 A | 5/2003 |
| JP | 2007-312244 A | 11/2007 |
| KR | 2001-0045783 A | 6/2001 |
| KR | 10-2001-0062306 A | 7/2001 |
| KR | 2002-0004645 A | 1/2002 |
| KR | 10-2003-0060055 A | 7/2003 |
| KR | 10-2003-0087914 A | 11/2003 |
| KR | 10-2004-0034398 A | 4/2004 |
| KR | 10-2004-0039944 A | 5/2004 |
| KR | 10-2004-0072961 A | 8/2004 |
| KR | 10-2005-0022988 A | 3/2005 |
| KR | 10-2005-0081836 A | 8/2005 |
| KR | 10-2005-0099472 A | 10/2005 |
| KR | 10-2005-0100882 A | 10/2005 |
| KR | 10-2005-0103127 A | 10/2005 |
| KR | 10-2006-0004935 A | 1/2006 |
| KR | 10-2006-0014910 A | 2/2006 |
| KR | 10-2006-0029452 A | 4/2006 |
| KR | 10-2006-0042858 A | 5/2006 |
| KR | 10-2006-0069378 A | 6/2006 |
| KR | 10-2006-0079784 A | 7/2006 |
| KR | 10-2006-0090191 A | 8/2006 |
| KR | 10-2006-0134058 A | 12/2006 |
| KR | 10-2007-0048552 A | 5/2007 |
| WO | WO 2004/042963 A1 | 5/2004 |
| WO | WO-2005/039108 A2 | 4/2005 |
| WO | WO-2006/052086 | 5/2006 |
| WO | WO-2007/024065 A1 | 3/2007 |
| WO | WO-2007/039023 A1 | 4/2007 |
| WO | WO 2007/052900 A1 | 5/2007 |
| WO | 10-2007-0076374 A | 7/2007 |
| WO | WO 2007/078155 A2 | 7/2007 |
| WO | WO-2007/078173 A1 | 7/2007 |
| WO | WO 2007/078174 A1 | 7/2007 |
| WO | 2007/091831 A2 | 8/2007 |
| WO | WO-2007/089797 A2 | 8/2007 |
| WO | WO 2007/126793 A2 | 11/2007 |
| WO | WO-2007/147431 | 12/2007 |

OTHER PUBLICATIONS

SAmmour et al, U.S. Appl. No. 61/019,058.*
NEC: "Optimised buffer status reporting" 3GPP TSG-RAN WG2# 58bis Meeting, Jun. 25-29, 2007, Tdoc R2-072515. XP002503220.
Catt, Ritt: "Consideration on UL buffer reporting" 3GPP TSG RAN WG2#55, R2-062934, Oct. 9-13, 2006, pp. 1-3. XP002513924.
Ericsson, "Scheduling Request in E-UTRAN", 3GPP TSG-RAN WG2 #47bis, R1-070471, 3RD Generation Partnership Project (3GPP), vol. RAN WG1, Jan. 10, 2007, XP050104502.
LG Electronics Inc., "UE State Transition in LTE_ACTIVE", 3GPP TSG-RAN WG2 #52 R2-061002, 3RD Generation Partnership Project (3GPP), vol. RAN WG2, Mar. 23, 2006, XP050130928.
Motorola, "Contention-free Intra-LTE Handover", 3GPP TSG-RAN WG2 #57 R2-070730, 3RD Generation Partnership Project (3GPP), vol. RAN WG2, Feb. 9, 2007, XP050133763.
Nokia, "Buffer Reporting for E-UTRAN", 3GPP TSG-RAN WG2 Meeting #52 R2-060829, Retrieved from the Internet: URL: WWW. 3gpp.org>, pp. 1-5, Mar. 27-31, 2006, XP002503218.
Nokia, "Uplink Scheduling for VoIP", 3GPP TSG-RAN WG2 Meeting #57 R2-070476, Retrieved from the Internet: Semi persistant scheduling; pp. 1-15, Feb. 12, 2007, XP008125208.
Texas Instruments, "UL Synchronization Management and Maintenance in E-UTRA", 3GPP TSG RAN WG1 #49 R1-072198, 3RD Generation Partnership Project (3GPP), vol. RAN WG1, May 1, 2007, XP050105936.
Texas Instruments, "UL Synchronization Management in LTE_ACTIVE", 3GPP TSG RAN WG1 #48bis R1-071478, 3RD Generation Partnership Project (3GPP), vol. RAN WG1, Mar. 21, 2007, XP050105413.
3GPP; "Redundant retransmission restraint in RLC-AM"; ZTE; R2-061234; 3GPP TSG-RAN WG2 meeting #53; Shanghai, China; May 8-12, 2006; XP050131180.
3GPP; Digital cellular telecommunications system (Phase 2+); Functional stage 2 description of Location Services (LCS) in GERAN; (3GPP TS 43.059 version 7.3.0 Release 7); ETSI TS 143 059 V7.3.0 (May 2007); XP014038519.
Kashima, Method And Apparatus For Providing Timing Alignment, U.S. Appl. No. 60/944,662.
Wu et al., Enhanced Random Access Response Formats in E-UTRAN, U.S. Appl. No. 61/006,348.
Ericsson et al.,"Framework for Scheduling Request and Buffer Status Reporting," TSG-RAN WG2 Meeting #60, Tdoc R2-074691, Jeju, Korea, Nov. 5-9, 2007, 4 pages.
Ericsson, 3GPP TSG RAN WG2 #54, "Basic Principles for the Scheduling Request in Lte," Tdoc R2-062350, Tallinn, Estonia, Aug. 28 - Sep. 1, 2006, 2 pages.
Motorola, 3GPP TSG RAN1 #47, "Synchronized Random Access Channel and Scheduling Request," R1-063046, Riga, Latvia, Nov. 6-10, 2006, 3 pages.
NTT DoCoMo et al., 3GPP TSG RAN WG1 Meeting #47, "Scheduling Request Transmission Method for E-Utra Uplink," R1-063301, Riga, Latvia, Nov. 6-10, 2006, 6 pages.

* cited by examiner (a)

(b)

(a)

(b)

(a)

(b)

(a)

(b)

METHOD FOR TRANSMITTING PDCP STATUS REPORT

CROSS-REFERENCE

The present application claims priority benefit to the following applications, which contents are all incorporated by reference herein: U.S. Provisional Application Nos. 61/037,309 (filed Mar. 17, 2008), 61/038,470 (filed Mar. 21, 2008), and Korean Patent Application No. 10-2009-0022158 (filed Mar. 16, 2009).

BACKGROUND

The present invention relates to a method for transmitting PDCP status reports. In the related art, transmitting PDCP status reports was performed, but radio resources were unnecessarily wasted. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that a method of for transmitting PDCP status reports is provided, which results in more efficient use of radio resources.

DETAILED DESCRIPTION

The inventive concepts and features herein related to a method for transmitting PDCP status reports are explained in terms of a Long Term evolution (LTE) system or other so-called 43G communication systems, which is an enhancement to current 33GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Second generation (23G) mobile communications relate to transmitting and receiving voice signals in a digital manner, and include technologies such as CDMA, GSM, and the like. As an enhancement from GSM, GPRS was developed to provide packet switched data services based upon GSM.

Third generation (33G) mobile communications relate to transmitting and receiving not only voice signals, but also video and data. The 33GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

Figure 1:
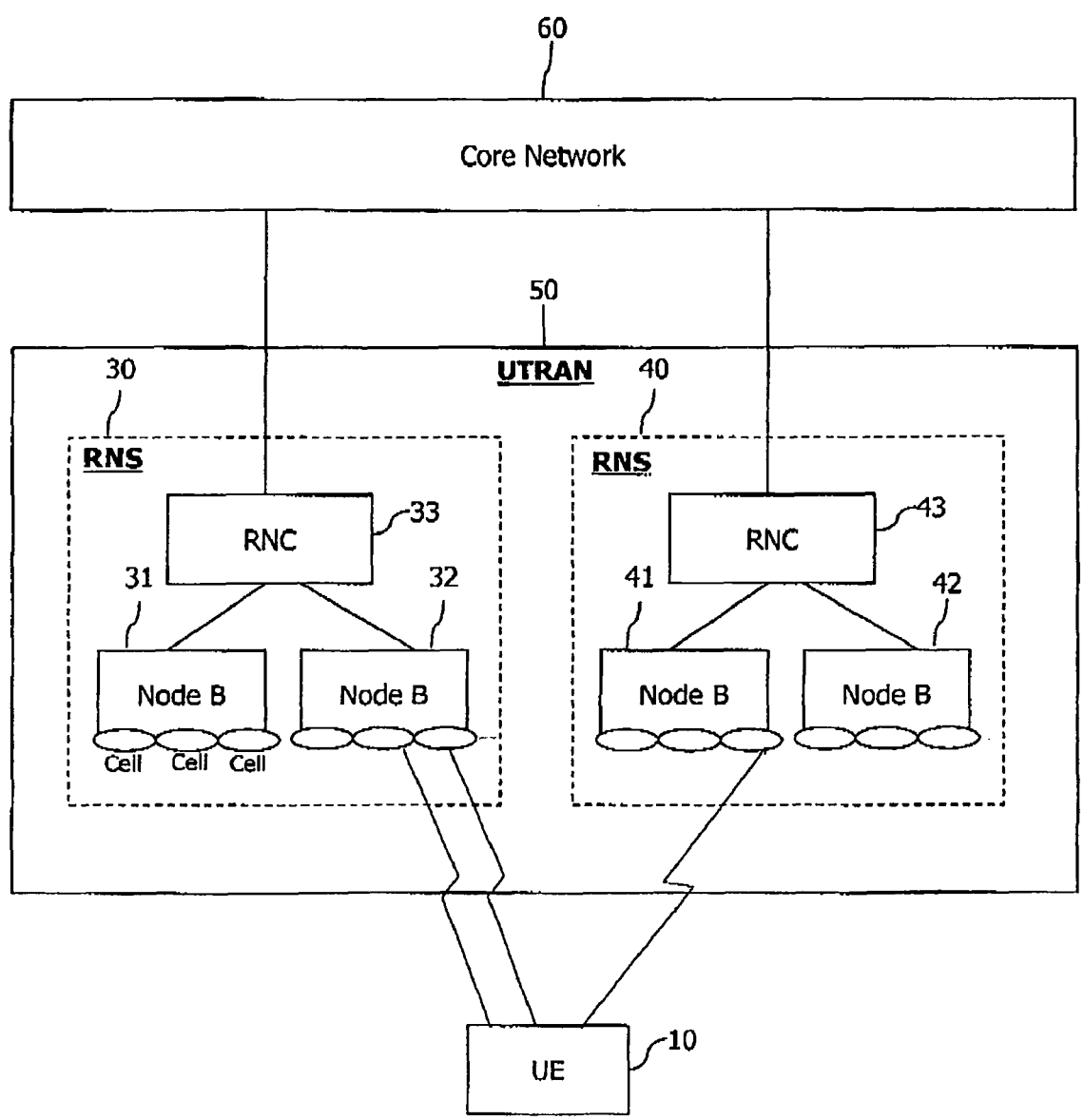
FIG. 1 shows an exemplary network architecture of a Universal Mobile Telecommunications System (UMTS).

FIG. 1 shows the network architecture of a Universal Mobile Telecommunications System (UMTS). The UMTS system is basically comprised of user equipment (UEs) 10, a UMTS Terrestrial Radio Access Network (UTRAN) 50, and a core network (CN) 60. The UTRAN 50 has one or more radio network sub-systems (RNS) 30, 40, and each RNS has a radio network controller (RNC) 33, 43, and one or more Node Bs 31, 32, 41, 42 that are managed by the RNC 33, 43. One or more cells exist for a Node B.

Figure 2:
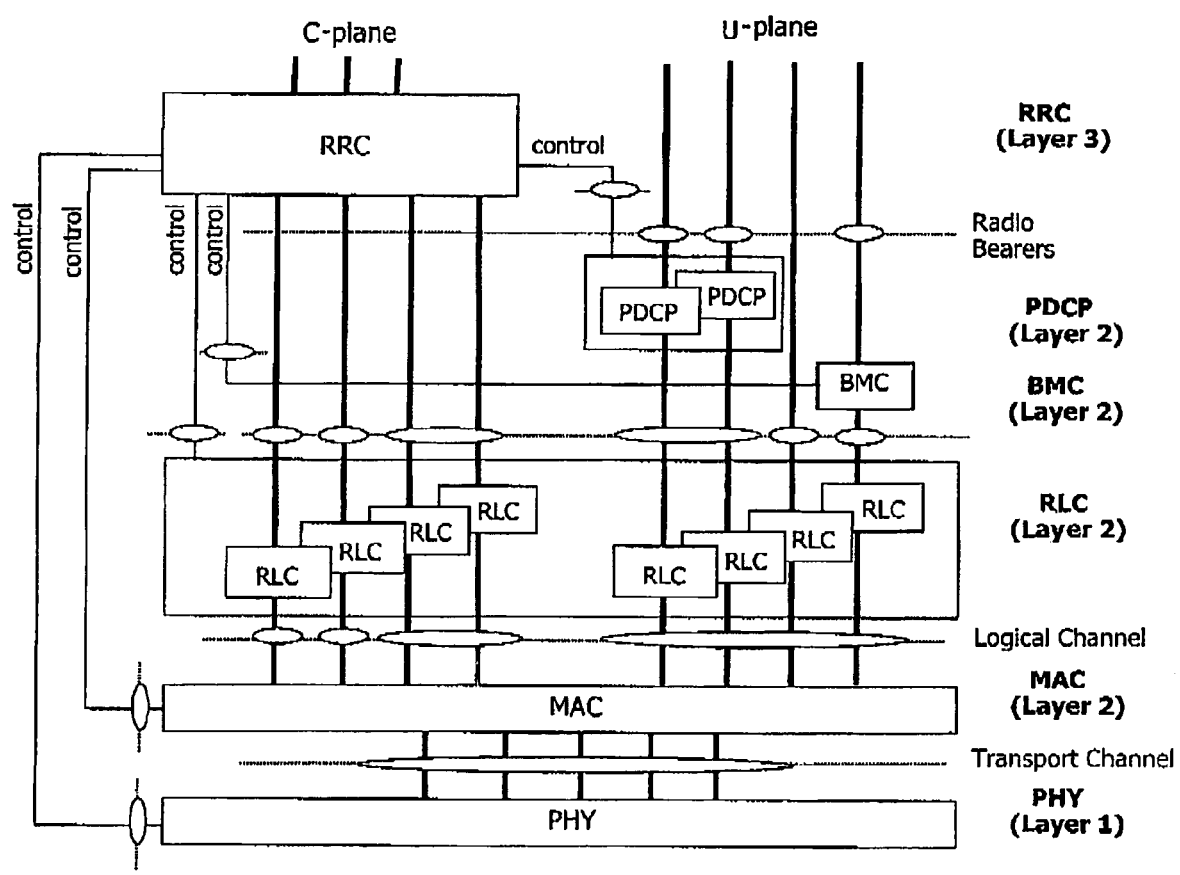
FIG. 2 shows an exemplary radio interface protocol stack used between a mobile terminal and a UTRAN based upon the 33GPP radio access network standard.

FIG. 2 shows the radio protocol stack used in UMTS. The radio protocol layers exist in pairs in the mobile terminal and in the UTRAN, and handle data transmission over the radio interface. This radio protocol stack is largely divided into three layers: L1 (Layer 1), L2 (Layer 2) and L3 (Layer 3).

L1 (Layer 1) has the physical layer (PHY) that uses various types of radio transmission techniques to transmit data with reliability over the radio interface. The PHY layer is connected to an upper layer (the MAC layer) via transport channels, which can be divided into dedicated transport channels and common transport channels.

L2 (Layer 2) is comprised of four sub-layers: MAC, RLC, PDCP and BMC, each of which will be described in more detail below.

The MAC (Media Access Control) layer performs mapping of various logical channels to various transport channels, and also performs logical channel multiplexing of multiple logical channels to a single transport channel. The MAC layer is connected with an upper layer (the RLC layer) via one or more logical channels. Based on the type of information that is transmitted, these logical channels can be divided into control channels used to transmit control plane information and traffic channels used to transmit user plane information. Based on the types of transport channels that are managed, the MAC layer can be divided into a MAC-b sub-layer, a MAC-c/sh sub-layer, a MAC-d sub-layer, a MAC-hs sub-layer, and a MAC-e sub-layer. The MAC-b sub-layer handles the management of a BCH (Broadcast CHannel) used to broadcast system information. The MAC-c/sh sub-layer manages shared transport channels, such as the FACH (Forward Access CHannel), the DSCH (Downlink Shared CHannel), and the like, which are shared with other mobile terminals. The MAC-d sub-layer handles the management of dedicated transport channels, such as the DCH (Downlink Shared Channel), with respect to a particular mobile terminal. In order to support high-speed data transmissions on the downlink and uplink, the MAC-hs sub-layer manages the HS-DSCH (High Speed Downlink Shared CHannel), which is a transport channel for transmitting high-speed downlink data. The MAC-e sub-layer manages the E-DCH (Enhanced Dedicated CHannel), which is a transport channel for high speed uplink data transmissions.

The RLC (Radio Link Control) layer handles the guarantee of the quality of service (QoS) of each radio bearer (RB) and the transmission of data thereof. For the RLC to guarantee the QoS that is unique to the RB, one or two independent RLC entities exist for each RB, and three types of RLC modes (TM: transparent Mode; UM: Unacknowledged Mode; AM: Acknowledged Mode) are provided to support the various QoS. Also, the RLC adjusts the size of data to be appropriate for transmission over the radio (air) interface by a lower layer, and performs the functions for segmentation and concatenation of the data (Service Data Units: SDUs) received from an upper layer (i.e. RLC layer).

The PDCP (Packet Data Convergence Protocol) layer is located above the RLC layer and allows the data to be transmitted using IP packets (such as IPv4 or IPv6) over the radio (air) interface having relatively small bandwidth in an effective manner. To do so, the PDCP layer performs a header compression function, which allows transmission of data that is only necessary in the header portion of data such that transmission efficiency over the radio (air) interface is increased. The PDCP layer only exists in the PS (Packet Switched) domain because header compression is a basic function, and one PDCP entity exists per RB in order to effectively provide header compression functions with respect to each PS service.

The BMC (Broadcast/Multicast Control) layer exists above the RLC layer and performs the functions related to scheduling of cell broadcast messages and broadcasting to mobile terminals located in a particular cell.

L3 (Layer 3) has the RRC (Radio Resource Control) layer, located at the lowermost portion thereof, that is defined only in the control plane, for controlling parameters of L1 and L2 with respect to the establishment, re-establishment and release of radio bearers, as well as controlling the logical channels, transport channels and physical channels. Here, a radio bearer refers to a logical path that is provided by L1 and L2 of the radio protocol for data transfer between the mobile terminal and the UTRAN. In general, establishment of the radio bearer refers to a procedure of setting the characteristics of the radio protocol layers and channels needed for providing a particular service, and then setting each particular parameter and operation methods thereof.

Figure 3:
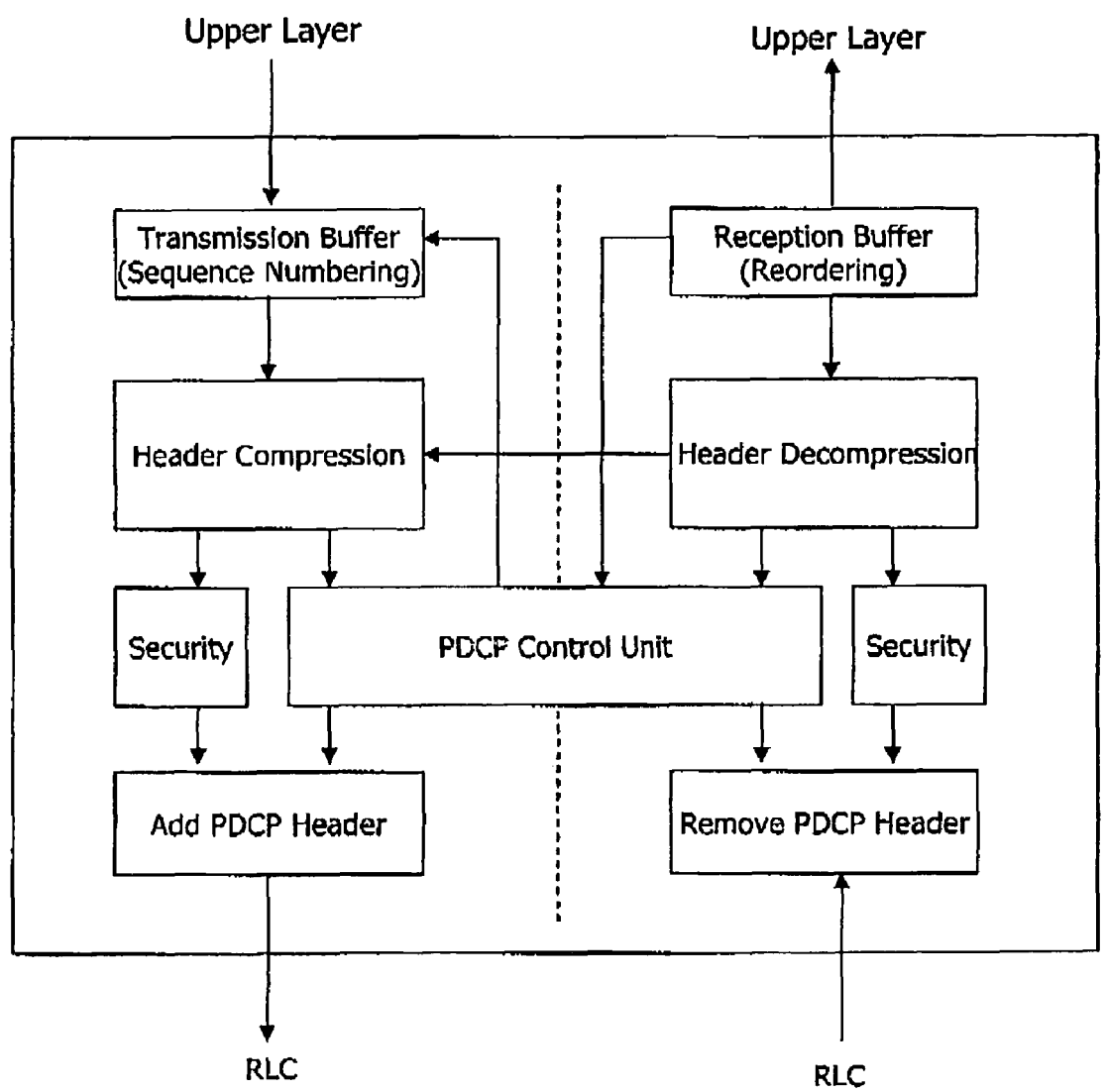
FIG. 3 shows an exemplary PDCP entity if the PDCP layer of FIG. 2.

FIG. 3 will be referred to in describing the PDCP layer in more detail as follows. An exemplary PDCP entity of the PDCP layer of FIG. 2 is shown. The PDCP entity of FIG. 3 is connected to the RRC layer or a user application located thereabove, and connected to the RLC layer therebelow. This PDCP entity is comprised of a transmitting side and a receiving side.

In FIG. 3, the left side depicts the transmitting side having a transmission buffer, a header compression unit, a security handling unit, and a PDCP header attachment unit, while the right side depicts the receiving side having a PDCP header removal unit, security handing unit, header compression cancellation unit and a reception buffer. Such transmitting side and receiving side share a PDCP control unit.

The transmitting side PDCP entity forms PDUs (Protocol Data Units) using SDUs (Service Data Units) received from the upper layer or using control information that was generated by the PDCP entity itself and then transmits such PDUs to a peer PDCP entity (i.e. a PDCP entity within the RNS) at the receiving side. This PDCP entity at the receiving side converts the received PDCP PDUs into PDCP SDUs or extracts control information from the received PDCP PDUs.

It should be noted that the functional blocks shown in FIG. 3 can be implemented in many different ways as could be understood by those skilled in the art.

As mentioned previously, The PDUs generated by the PDCP entity at the transmitting side can be distinguished as Data PDUs and Control PDUs.

The PDCP Data PDU is a data block that is made at the PDCP entity by processing the SDU received from an upper layer. The PDCP Control PDU is a data block that the PDCP entity itself generates in order to transfer control information to a peer PDCP entity.

The PDCP Data PDU is generated for the radio bearer (RB) of both the user plane (U-plane) and of the control plane (C-plane), and some of the PDCP functions are selectively applied to the user plane.

Namely, the header compression function is applied for only the U-plane data, and the integrity protection function among the functions of the security handling unit is applied only for the C-plane data. In addition to the integrity protection function, the security handling unit also has a ciphering function that maintains data security, and such ciphering function applies to both U-plane data and C-plane data.

The PDCP Control PDU is generated only by the radio bearer (RB) of the U-plane, and there are two types: (1) a PDCP status report message (i.e. PDCP Status Report) used to inform the transmitting side about the PDCP entity reception buffer status and (2) a Header Compression Feedback Packet used to inform about the header decompressor state to the header compressor of the transmitting side.

The PDCP status report message (PDCP Status Report message) is transmitted from the receiver PDCP to the transmitter PDCP in order to inform the transmitter PDCP about the PDCP PDUs that were received or not received by the receiver PDCP, such that non-received PDCP SDUs can be retransmitted and received PDCP SDUs need not be retransmitted. This PDCP status report message can be sent in the form of a PDCP Status PDU, and its exemplary structure is shown in FIG. 4.

Figure 4:
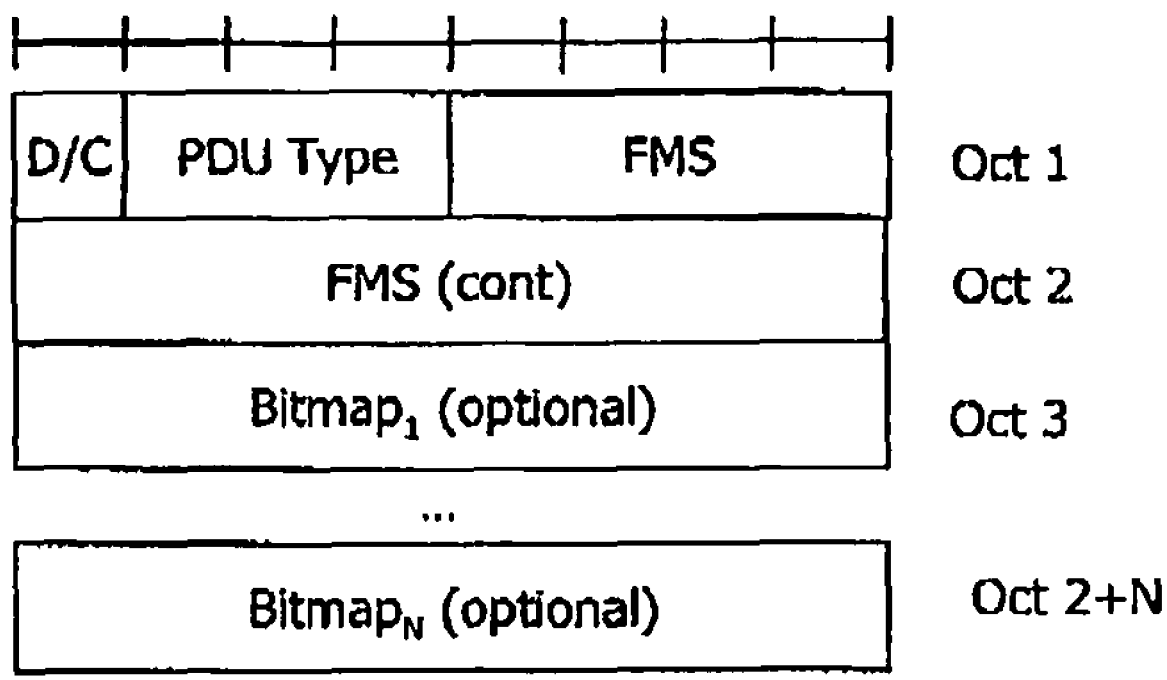
FIG. 4 shows an exemplary PDCP Status PDU generated by the PDCP Control Unit of FIG. 3.

FIG. 4 shows an exemplary PDCP Status PDU generated by the PDCP Control Unit of FIG. 3. As can be seen, the PDCP Status PDU is comprised of one or more octets (1 octet=8 bits) that includes a D/C (Data/Control) field, a PDU Type field, a First Missing Sequence Number (FMS) field, and a bit map (Bitmap) field.

The D/C field is comprised of 1 bit that is used to inform whether the corresponding PDU is a Data PDU or a Control PDU.

The PDU Type field is comprised of 3 bits used to inform about the type of Control PDU. For example, the value of '000' signifies a PDCP Status Report, the value of '001' signifies Header Compression Feedback Information, and other types of values are reserved for future use.

The FMS field is comprised of 12 bits and is used to indicate the sequence number (SN) of the first PDCP SDU that was not received by the receiver (i.e., a first out-of-sequence PDCP SDU, a first not received PDCP SDU, a first missing PDCP SDU, etc.).

The Bitmap field is of variable length, and if a bit value of 0 indicates that the data of that position was not received properly, while a bit of 1 indicates that the data of that position was successfully received.

Such PDCP Status Report can be used for various types of situations that would require PDCP re-establishment, such as handover (HO) situations.

The transmitting side (such as the mobile terminal or Node B) PDCP entity receives PDCP SDUs from the upper layer and stores them in a transmission buffer after transmission in case retransmission is later required. Thereafter, when handover (or other PDCP re-establishment situation) occurs, a report about the PDCP SDUs that were received and the PDCP SDUs that were not received are provided via a PDCP Status Report and the PDCP SDUs that were not received are retransmitted after handover.

For example, the PDCP entity in the mobile terminal receives PDCP SDUs from the upper layer, transmits them to the base station, and stores them in a transmission buffer even after transmission. Then, when handover (or some other situation requiring PDCP re-establishment) occurs, the mobile terminal receives information (via a PDCP Status Report that is fed back) about the PDCP SDUs not received by the base station, and such PDCP SDUs are retransmitted.

As described above, when handover (or some other situation requiring PDCP re-establishment) occurs, the Node B changes from the source to the target, and since the PDCP entity also changes, retransmissions must be used.

An example of PDCP Status PDU generation procedure is as follows.

First, after a radio bearer (RB) is configured by the upper layer upon deciding that a PDCP Status Report message should be transmitted, a status report (as indicated below) is compiled, made into a PDU format for transmission, and submitted to the lower layer setting the FMS field to indicate the PDCP Sequence Number of the first missing (or out-of-sequence) PDCP SDU;

allocating, as the length of the Bitmap field, the length of the value (i.e. the number of PDCP sequence numbers) from (and not including) the first not received (out-of-sequence) PDCP SDU up to (and including) the last out-of-sequence PDCP SDU received. Here, this Bitmap field length is 8 bits maximum. If less than 8 bits, rounding up to the next multiple of 8 bits is performed, while if over 8 bits, the next Bitmap field is used;

setting the corresponding bit positions of the Bitmap field as 0. Here, 0 signifies the PDCP SDUs not received from the transmitter by the lower layer or signifies the PDCP SDUs that were received but header decompression was unsuccessful. (Namely, setting as '0' in the corresponding position in the bitmap field all PDCP SDUs that have not been received as indicated by lower layers and optionally, PDCP PDUs for which decompression has failed);

setting the corresponding bit positions of the Bitmap field as 1. Here, 1 signifies other PDCP SDUs (not described above), namely, the PDCP SDUs that were successfully received at the lower layer. (Namely, indicating in the bitmap field as '1' all other PDCP SDUs).

However, the PDCP Status PDU generation procedure above not only results in situation where unnecessary information is transmitted two times, but also situations where necessary information cannot be transmitted at all.

Figure 5:
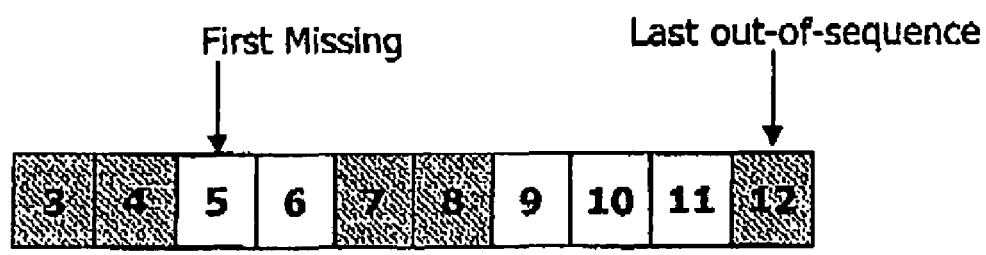
FIG. 5 shows an example of how a PDCP Status PDU is generated.
Figure 5:
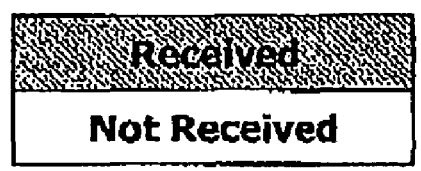
Figure 5:
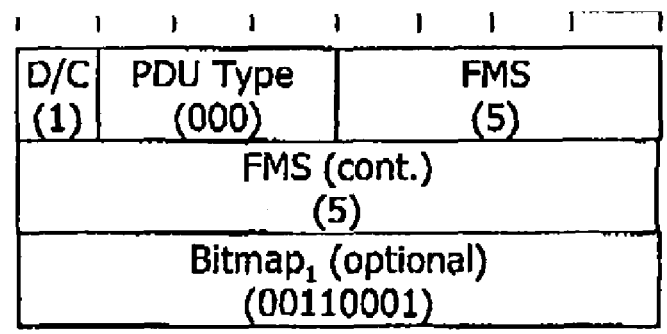
Figure 6:
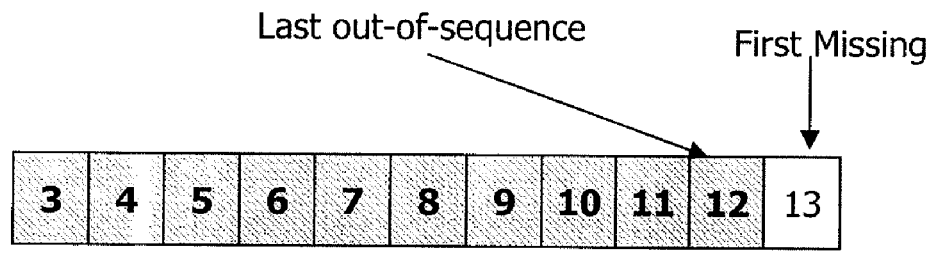
FIG. 6 shows another example of how a PDCP Status PDU is generated.
Figure 6:
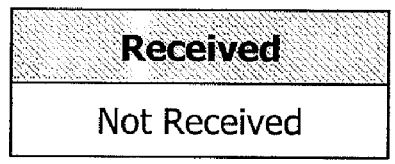
Figure 6:
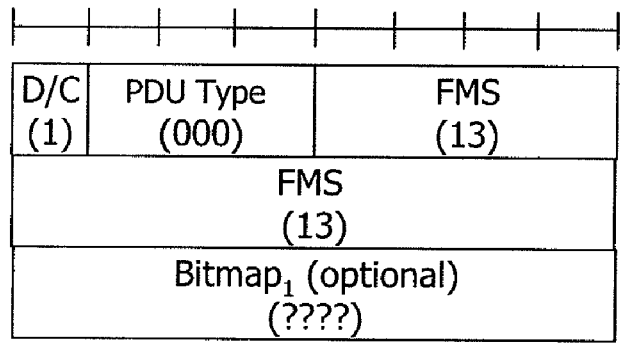

Referring to FIGS. 5 and 6, an exemplary procedure of generating the PDCP Status PDU will be explained below:

FIG. 5 shows one example of generating PDCP Status PDUs.

As shown in (a) of FIG. 5, among a sequence of SDUs having sequence numbers 3 through 12, it is assumed that the lower layer at the receiver has received SDUs of 3, 4, 7, 8, 12, while SDUs of 5, 6, 9, 10, 11 were not received.

In such case, as shown in (b) of FIG. 5, according to this PDCP Status PDU generation procedure, the mobile terminal sets the FMS field to 5, which is the sequence number of the first not received SDU.

Also, as the sequence number of the last out-of-sequence received SDU is 12 (because SDUs 7, 8 were received and SDU 12 was received), a total of 8 bits is needed to express the SDUs having sequence numbers from 5 through 12 (=a total of eight SDUS), and thus a Bitmap field of length 8 is set.

Additionally, with respect to the SDUs having sequence numbers from 5 through 12, the mobile terminal uses each bit of the Bitmap field to express whether reception of each SDU was successful or not. Namely, the Bitmap field would be set to 00110001 for the above situation.

As explained thus far, according to the PDCP Status PDU generation procedure, the information for the SDU corresponding to sequence number 5 is included into the PDCP Status PDU two times (twice), which results in a waste of radio resources.

Also, the last out-of-sequence received SDU (namely, the SDU with SN=12) is always set to 1 in the Bitmap field, and thus such inclusion results in a waste of radio resources.

Additionally, with respect to PDCP SDU 12, which is the last SDU in the above procedure, according to its definition, as this is a successfully received SDU in the receiver PDCP entity, it will always be set to 1. Thus, information about this SDU would not need to be transmitted.

FIG. 6 shows another exemplary procedure for generating a PDCP Status PDU.

As shown in (a) of FIG. 6, among the SDUs having sequence numbers 3 through 13, assume that the lower layer of the receiver received SDUs 3~12, while SDU 13 was not received.

In such case, as shown in (b) of FIG. 6, according to such PDCP Status PDU generating method, the mobile terminal sets the FMS field to 13, which is the sequence number of the SDU that was first not received.

Also, as the last out-of-sequence SDU has a sequence number of 12, expressing the SDUs 12 and 13 requires a size of 2 bits, but upon rounding up (to the nearest multiple of 8), the length of the Bitmap field is 8 bits, thus 1 byte is set.

Additionally, the mobile terminal needs to express whether SDUs 12 and 13 were received or not by using respective bits in the Bitmap field. However, as the last received out-of-sequence SDU has a sequence number of 12, which is lower than the sequence number 13 of the first not received SDU, when each bit of the Bitmap field is being set, errors occur. Also, as the Bitmap field has a length of 8 bits (=1 byte), while only 2 bits need to be filled, it is unclear as to how the remaining bits are to be filled.

Also, because the receiver properly received all SDUs, only the first not received SDU 13 needs to be reported. Namely, there is no need for the Bitmap field in this situation. Despite this, as described above, the length of the Bitmap field of the PDCP Status PDU is set to 1 byte and transmitted, which results in a waste of radio resources.

Accordingly, based on such problem recognition, the present invention was conceived such that the PDCP Status Report message is generated more effectively, which results in minimizing the waste of radio resources.

Also, the present invention allows for more efficient providing of information related to the SDUs received and not received at the receiver.

To address the above issues, a PDCP status report transmitting method is provided and comprises the steps of receiving a PDCP re-establishment request from an upper layer; determining whether any PDCP SDUs stored out-of-sequence exist; and if an PDCP SDUs stored out-of-sequence exist, then allocating as the length of a Bitmap field of a PDCP Status Report message, the number of bits that equals the number of SDUs from the SDU after the first missing PDCP SDU up to a last received out-of-sequence PDCP SDU.

If no out-of-sequence stored PDCP SDUs exist, the Bitmap field is not included in the PDCP Status Report message.

The PDCP SDUs can be stored in a buffer.

The above steps are performed for an RLC(Radio Link Control) AM(Acknowledged Mode).

The PDCP re-establishment request can occur in a handover situation.

The PDCP Status Report message can also include e FMS field, in which a sequence number of the first missing PDCP SDU is set.

The Bitmap field value of 0 can indicate that the corresponding PDCP SDU was not successfully received, while the Bitmap value of 1 can indicate that the corresponding PDCP SDU was successfully received.

Regarding the effects of the present invention, the size of the PDCP Status Report can be reduced, only necessary information can be included, and more effective use of radio resources can be achieved The features described herein can be applied to the so-called LTE (Long Term Evolution) technologies, which are being developed after 33G mobile communications in anticipation of rapidly increasing data traffic. Such is one aspect of developing an evolved network that can support greater bandwidth, and the term E-UTRAN (Evolved UTRAN) is being used.

However, the features and characteristics described herein are not meant to be limited to LTE, but can also be adapted, applied and implemented in various other communication systems and methods, such as GSM, GPRS, CDMA, CDMA2000, WCDMA, IEEE 802.xx, UMTS, etc.

Hereafter, the term 'mobile terminal' is used, but can also be referred to US (User Equipment), ME (Mobile Equipment), MS (Mobile Station), and the like. Also, a mobile terminal can include highly portable devices having communication functions, such as a portable phone, a PDA, a Smart Phone, a notebook/laptop computer, etc., as well as less portable devices, such as personal computers (PC), vehicle mounted devices, and the like.

The technical terms and phrases used herein are used to describe features in particular embodiments, and are not meant to limit the concepts of the present invention. Also, if a technical term herein is not specifically defined in a different manner, such will be interpreted to have the meaning that one of ordinary skill in the art would understand, without an excessively broad or excessively narrow interpretation. If any terms herein have been erroneously used or not completely technically accurate, then such terms may be clarified or interpreted as those skilled in the art would deem appropriate. Also, certain general terms used herein shall be interpreted according to their dictionary meaning, or interpreted in view of the context without being construed too narrowly.

Also, any words or phrases used herein in the singular may be interpreted to cover their plurality, unless clearly described to the contrary. The word "including" or "comprising" or the like should not be interpreted to mean that the various elements or steps always need to be present. Some elements or steps may not need to be present, or additional elements or steps may also be present.

The words "first" or "second" or other terms that connote an order or sequence may be used to describe various different elements or steps to provide distinguishing therebetween, unless specified that the numerical order is of some significance. For example, without exceeding the scope of the present invention, a first element can also be explained as a second element, while a second element can also be explained as a first element.

For any description about one element being "connected to" or "connected with" or the like, with respect to another element, a direct connection may be possible or an intermediate element may exist between the two elements. On the other hand, if two elements are described to be "directly" connected together, this may mean that no other elements exists therebetween.

Hereafter, with reference to the attached drawings, some embodiments will be explained, and regardless of the reference numbers in the drawings, some elements may be labeled with the same reference numbers and any repetitive explanations may have been omitted merely for the sake of brevity. Also, certain aspects of the related or conventional art, which may be a basis for the present invention, may have not been explained but could be understood by those skilled in the art. The features shown in the attached drawings are merely depicted to improve the understanding of the present invention and should not be interpreted to limit the teachings of the present invention. As such, various modifications, changes, equivalents and replacements are part of the inventive features described throughout this description.

Figure 7:
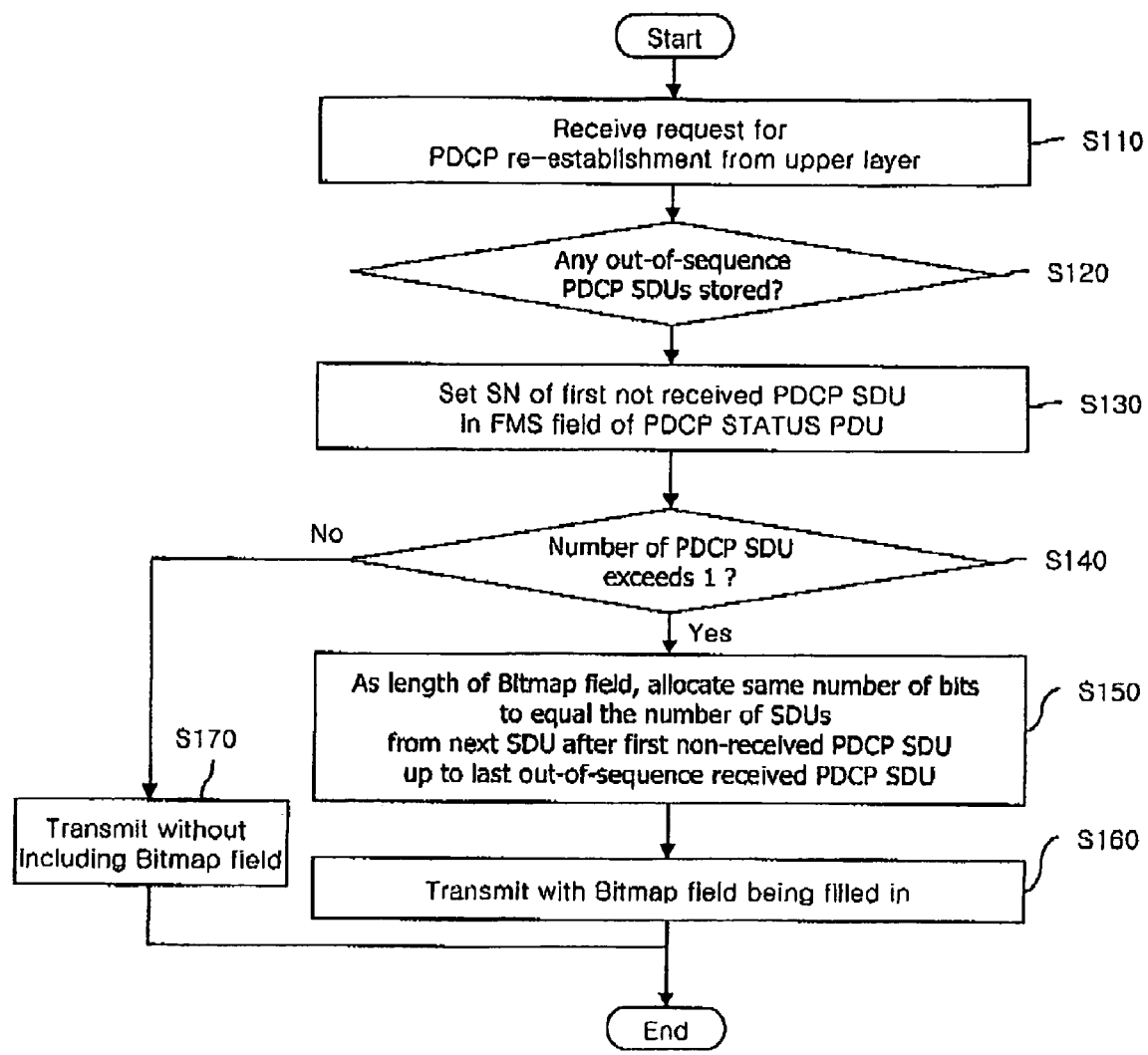
FIG. 7 shows an exemplary flow chart of the present invention.

FIG. 7 shows an example of a flowchart that depicts a PDCP Status Report procedure of the present invention. It can be understood that the total number of SDUs, starting from the SDU after the first missing PDCP SDU and up to the last received out-of-sequence PDCP SDU, are counted and a corresponding number of bits are allocated to the length of the Bitmap field. Thus, in the present invention, with respect to the RB established to transmit the PDCP status report message, when allocating the length of the Bitmap field of the PDCP Status PDU in the PDCP status report message, the first missing PDCP SDU is not considered, but the SDU after the first missing PDCP SDU and up to the last received out-of-sequence PDCP SDU.

First, the PDCP layer receives, from an upper layer, a PDCP re-establishment request with respect to a radio bearer (RB)(S110). Here, the PDCP re-establishment request may occur for a handover situation of a mobile terminal.

Then, for the RB, it is checked to see if there are any non-sequential (or out-of-sequence) PDCP SDUs that were stored (S120).

If so, the value of the sequence number (SN) of the first not received PDCP SDU is used to set the FMS field of the PDCP Status PDU (S130).

Also, the total number of PDCP SDU not received (i.e. missing PDCP SDUs) is determined, and checked to see if such exceeds 1 (S140). If the total number is 1 or less, the Bitmap field is not included in the PDCP Status PDU (S170). However, as an alternative, the Bitmap field can be set according to procedure S150 and included.

If the total number exceeds 1, then within a range defined from the very next SDU right after the first not received PDCP SDU up to the last received PDCP SDU (in other words, among the non-sequentially received PDCP SDUs, the PDCP SDU having the highest sequence number, namely, the last out-of-sequence PDCP SDU), the total number of PDCP SDUs within such range is obtained and the same number of bits in the Bitmap field is set as its length (S150).

In other words, a Bitmap field having a length in bits that is equal to the total number of PDCP SDUs (Sequence Numbers) from and not including the first missing PDCP SDU up to and including the last out-of sequence PDCP SDU is allocated.

Here, the number of bits is rounded up by multiples of 8, in order to determine the length of the Bitmap field. When obtaining the total number, the counting can be based on the PDCP SDUs or the PDCP PDUs. When PDCP PDUs are to be used, then the number of PDCP Control PDUs is excluded, and only the number of PDCP Data PDUs is used.

In the above procedure (S150) for setting the length of the Bitmap field, the first not received PDCP SUD is excluded from consideration, but the last out-of-sequence PDCP SDU is considered. Alternatively, the last out-of-sequence PDCP SDU may sometimes be excluded, because such is successfully received and always set to 1. In such case, the PDCP SDU just before the last out-of-sequence PDCP SDU is considered.

Thereafter, based in the Bitmap field length, the Bitmap field is filled and the transmitted (S160). Here, the Bitmap field has a first position bit containing information for a PDCP SDU having a sequence number equal to FMS field value+1, which is set to 1 is successfully received or set to 0 is not successfully received. As such, the Bitmap field has an Nth position bit containing information for a PDCP SDU having a sequence number equal to FMS field value+N, which is set to 1 is successfully received or set to 0 is not successfully received.

This can be described in terms of the following Table:

| Bit | Description |
|---|---|
| 0 | Sequence Number = FMS field value + Bitmap, corresponding bit position N value for PDCP SDU modulo 4096 was not successfully received at receiver. The Nth bit position is N in Bitmap field. I.e. the first bit position of Bitmap field is 1. |
| 1 | Sequence Number = FMS field value + Bitmap, corresponding bit position N value for PDCP SDU modulo 4096 was successfully received at receiver and no need for retransmission. The Nth bit position is N in Bitmap field. I.e. the first bit position of Bitmap field is 1. |

As described thus far, according to the present invention, the first position bit of the BitMap field is used to inform about whether the PDCP SDU (having a sequence number corresponding to the FMS field value+1) was successfully received or not.

Also, according to the present invention, only when there are 2 or more PDCP SDUs that were not successfully received, by including the BitMap field into the PDCP Status Report message, radio resources can be effectively used.

Figure 8:
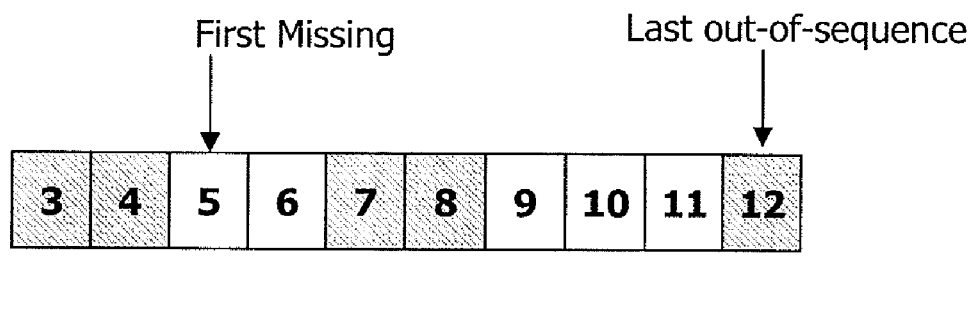
FIG. 8 shows an example of how a PDCP Status PDU is generated.
Figure 8:
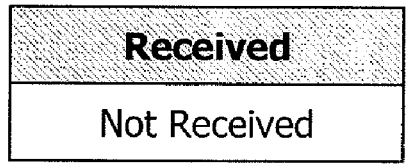
Figure 8:
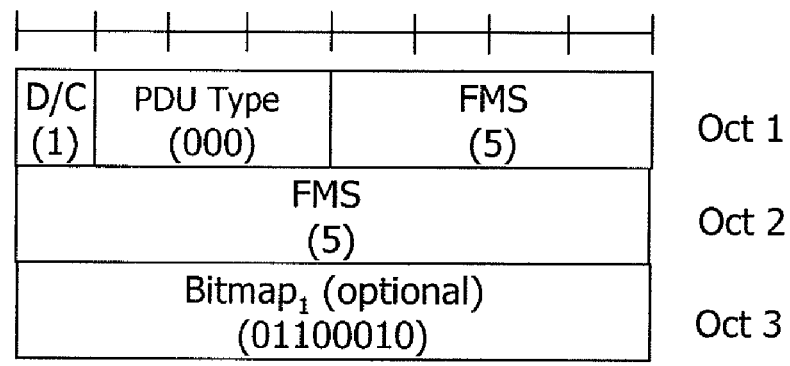

FIG. 8 shows another example of generating a PDCP Status PDU.

As shown in (a) of FIG. 8, among the sequential SDUs having sequence numbers from 3 through 12, the receiver lower layer received SDUs of 3, 4, 7, 8, 12, while SDUs of 5, 6, 9, 10, 11 were not received In such case, as shown in (b) of FIG. 8, according to the method of the present invention, the mobile terminal PDCP layer sets 5 into the FMS field, 5 being the sequence number of the first missing (not received).

Also, for the SDU after the first not received SDU, starting from such SDU having a sequence number of 6 up to the last received non-sequential (or out-of-sequence) SDU having a sequence number of 12 (because, SDUs 7, 8 are received, and SDU 12 is received), because the needed bits are 7 bits, upon rounding up to the 8 bit level, the Bitmap field length is set to 8 bits.

Also, the mobile terminal PDCP layer indicates whether reception of each SDU having sequence numbers 6 through 12 was successfully, and expressed by the bits of the Bitmap field. Here, such Bitmap field would have set 01100010.

Here, the bit at the first position of the Bitmap field indicates whether the PDCP SDU having SN=6 was successfully received or not.

Figure 9:
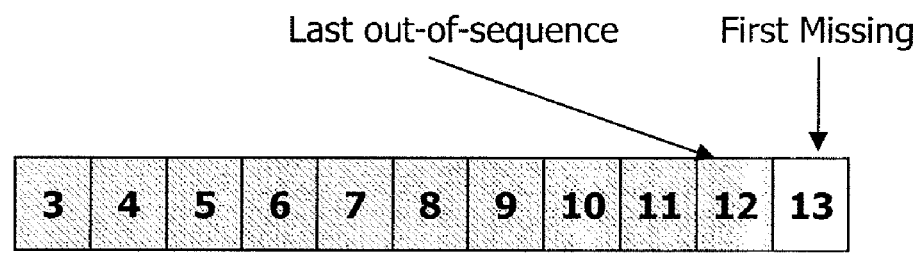
FIG. 9 shows an example of how a PDCP Status PDU is generated.
Figure 9:
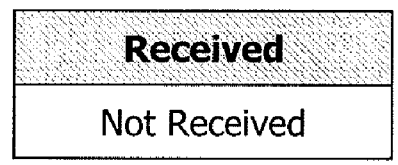
Figure 9:
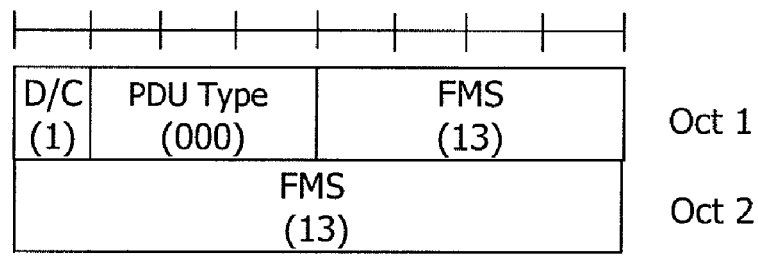

FIG. 9 shows another embodiment about the PDCP Status PDU generating procedure.

As shown in (2) of FIG. 9, among the sequential SDUs having sequence numbers 3 through 13, it is assumed that the lower layer of the receiving mobile terminal received SDUs 3~12, and SDU 13 is not received.

As such, as shown in (b) of FIG. 9, the PDCP layer of the mobile terminal sets into the FMS field, the sequence number 13 of the first not received SDU (S130).

Also, because it is found that the number of not received PDCP SDUs does not exceed 1 (S140), the Bitmap field is not included into the PDCP Status PDU (S170).

Referring back to FIG. 7, it was explained that alternatively, the Bitmap field could be included in the PDCP STATUS PDU. If reception is made as in (a) of FIG. 9, and the PDCP STATUS PDU includes the Bitmap field, in the procedure for setting the length of the Bitmap field (S150), the last received out-of-sequence PDCP PDU can also be excluded from consideration. This is because the last received out-of-sequence PDCP PDU is always in sequence with the sequence number of the PDCP SDU with successful reception, such information can be indirectly included and informed. In such case, the procedure for setting the length of the Bitmap field (S150) may be modified as follows.

The total number of PDCP SDUs having a sequence number within a range beginning from the PDCP SDU that has a sequence number that is immediately after that of the first not received PDCP SDU among the received out-of-sequence PDCP SDUs, and up to the PDCP SDU having a sequence number just prior to the last out-of-sequence PDCP SDU having the highest sequence number is obtained, and the Bitmap field size is set the have the same number of bits as the obtained total number of PDCP SDUs. Namely, when setting the Bitmap length, the first not received PDCP SDU is excluded from consideration and the last received out-of-sequence PDCP SDU is also excluded.

The method of the present invention explained thus far can be implemented in software, hardware, or a combination thereof. For example, the method of the present invention can be implemented as codes or commands of a software program that can be executed by a processor (CPU), and can be saved in a storage medium (e.g. memory, hard disk, etc.).

Certain aspects for the method of the present invention may be implemented in a mobile terminal or network entity (such as the RNC or Node B of FIG. 1). The mobile terminal or network entity may include the protocols of FIGS. 2 and 3, as can be understood by those skilled in the art.

Thus far, some exemplary embodiments of the present invention have been described, but such embodiments are not meant to limit the features described herein. As such, all reasonable and various modifications, changes, improvement and variations are part of the present invention.

INDUSTRIAL APPLICABILITY

The features and concepts herein are applicable to and can be implemented in various types of user devices (e.g., mobile terminals, handsets, wireless communication devices, etc.) and/or network entities that can be configured to support a method for transmitting PDCP status reports.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of handling PDCP (Packet Data Convergence Protocol) status reports, the method comprising:
receiving, from an upper layer, a request for PDCP re-establishment;
detecting whether there are any out-of-sequence PDCP SDUs (service data units) stored;
if there is at least one out-of-sequence PDCP SDU stored, allocating a bitmap field to have a length based on PDCP sequence numbers (SNs) from and not including a first out-of-sequence PDCP SDU up to and including a last out-of-sequence PDCP SDU; and
if a last PDCP SDU is a first missing PDCP SDU, allocating the bitmap field to have the length of 0.

2. The method of claim 1, wherein if there is no out-of-sequence PDCP SDU stored, the step of allocating the bitmap field is not performed.

3. The method of claim 1, wherein the PDCP SDUs are stored in a buffer.

4. The method of claim 1, wherein the steps are performed for a RLC (Radio Link Control) AM (Acknowledged Mode).

5. The method of claim 1, wherein the PDCP re-establishment occurs for HO (handover) situations.

6. The method of claim 1, wherein the PDCP status report includes an FMS (First Missing Sequence number) field.

7. The method of claim 6, further comprising:
setting the FMS field to the PDCP SN of the first missing PDCP SDU.

8. The method of claim 7, wherein a value of a particular bit in the bitmap field is 0 means that a PDCP SDU having a sequence number that equals a position N of the particular bit plus a value of the FMS field was unsuccessfully received, and
wherein the position N is an integer starting from 1.

9. The method of claim 1, wherein the bitmap field having a value of 1 indicates that a corresponding PDCP SDU was successfully received.

10. The method of claim 1, wherein the bitmap field having a value of 0 indicates that a corresponding PDCP SDU was unsuccessfully received.

11. The method of claim 1, wherein a value of a particular bit in the bitmap field is 1 means that a PDCP SDU having a sequence number that equals a position N of the particular bit plus a value of the FMS (First Missing Sequence number) field was successfully received, and
wherein the position N is an integer starting from 1.

12. A method of processing a PDCP (Packet Data Convergence Protocol) status report, the method comprising:
receiving, from an upper layer, a request for PDCP re-establishment;
generating a PDCP status report by setting an FMS (First Missing Sequence number) field, wherein the FMS field is set to the PDCP sequence number of the first missing PDCP SDU (Service Data Unit); and
if there are out-of-sequence PDCP SDUs stored, allocating a bitmap field having a length depending on the PDCP sequence numbers related to the first missing PDCP SDU through the last out-of-sequence PDCP SDUs; and
if a last PDCP SDU is a first missing PDCP SDU, allocating the bitmap field a length of 0.

13. The method of claim 12, wherein a bitmap is generated for the bitmap field based on the PDCP sequence numbers from and not including the first missing PDCP SDU up to and including the last out-of-sequence PDCP SDUs, rounded up to an octet.

14. The method of claim 12, wherein a bitmap is not generated for the bitmap field if the bitmap field is allocated the length of 0.

15. The method of claim 12, wherein each bit in the bitmap indicates whether or not at least one of reception and decompression of a corresponding PDCP SDU is correct.

16. The method of claim 12, wherein the allocating of the bitmap field results in a variable length for the bitmap field.

17. The method of claim 12, wherein the PDCP status report is further generated by filling the bitmap field with zeros (0) and ones (1), with a 0 bit indicating that a corresponding PDCP SDU was successfully received and a 1 bit indicating that a corresponding PDCP SDU was unsuccessfully received.

18. A method of generating a PDCP (Packet Data Convergence Protocol) status report, the method comprising:
receiving, from an upper layer, a request for PDCP re-establishment; and
compiling a PDCP status report by,
setting an FMS (First Missing Sequence number) field to the PDCP sequence number of the first missing PDCP SDU (Service Data Unit), and
allocating a bitmap field with a length of 0, if a last PDCP SDU is a first missing PDCP SDU, and otherwise, allocating the bitmap field with a particular length that is based on PDCP sequence numbers from and not including the first missing PDCP SDU up to and including the last out-of-sequence PDCP SDUs, rounded up to the next multiple of 8.

19. The method of claim 18, further comprising, prior to the compiling step, processing PDCP data PDUs received from the lower layer due to the re-establishment of the lower layers as a result of the request for PDCP re-establishment.

20. The method of claim 18, wherein each bit in the bitmap indicates whether or not at least one of reception and decompression of a corresponding PDCP SDU is correct.

21. The method of claim 18, wherein the PDCP status report is further complied by filling the bitmap field with zeros (0) and ones (1), with a 0 bit indicating that a corresponding PDCP SDU was successfully received and a 1 bit indicating that a corresponding PDCP SDU was unsuccessfully received.

22. A method of processing a PDCP (Packet Data Convergence Protocol) status report, the method comprising:
receiving, from an upper layer, a request for PDCP re-establishment;
generating a PDCP status report by,
setting an FMS (First Missing Sequence number) field to the PDCP sequence number of the first missing PDCP SDU (Service Data Unit), and
allocating a bitmap field with a length of 0, if a last PDCP SDU is a first missing PDCP SDU, or allocating the bitmap field with a particular length such that the particular length of the bitmap field is based on PDCP sequence numbers from and not including the first missing PDCP SDU up to and including the last out-of-sequence PDCP SDUs, rounded up to the next multiple of 8,
wherein the PDCP status report is further generated by filling the bitmap field with zeros (0) and ones (1), with a 0 bit indicating that a corresponding PDCP SDU was successfully received and a 1 bit indicating that a corresponding PDCP SDU was unsuccessfully received; and transmitting, via a lower layer, the generated PDCP status report.

23. The method of claim 22, wherein the steps are performed for a RLC (Radio Link Control) AM (Acknowledged Mode).

24. The method of claim 22, wherein the PDCP re-establishment occurs for HO (handover) situations.

25. The method of claim 22, wherein the PDCP status report is a PDCP Control PDU with a format including a D/C (Data/Control) field of 1 bit, followed by a PDU Type field of 3 bits, followed by the FMS field of 12 bits, and optionally followed by the bitmap field of 8 bits or a multiple thereof, and wherein the bitmap field is selectively included based on the allocating step.

* * * * *